US008657924B2

(12) United States Patent
Zheng et al.

(10) Patent No.: US 8,657,924 B2
(45) Date of Patent: Feb. 25, 2014

(54) PROCESS FOR SEPARATING GASES AND ADSORBENT COMPOSITIONS USED THEREIN

(75) Inventors: Jian Zheng, Williamsville, NY (US); Neil Andrew Stephenson, East Amherst, NY (US); Philip Alexander Barrett, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 247 days.

(21) Appl. No.: 13/206,773

(22) Filed: Aug. 10, 2011

(65) Prior Publication Data

US 2013/0036904 A1 Feb. 14, 2013

(51) Int. Cl.
*B01D 53/02* (2006.01)
*B01J 20/06* (2006.01)
*B01J 20/18* (2006.01)

(52) U.S. Cl.
USPC .................................. 95/139; 96/132; 96/153

(58) Field of Classification Search
USPC ........ 95/96, 117, 129, 139, 143, 900; 96/132, 96/153, 154; 423/230; 502/60, 79, 406
See application file for complete search history.

(56) References Cited

U.S. PATENT DOCUMENTS

| | | | | |
|---|---|---|---|---|
| 3,960,771 A * | 6/1976 | Tanaka et al. | .................... | 502/80 |
| 4,283,204 A * | 8/1981 | Savage | ............................... | 95/27 |
| 4,499,208 A * | 2/1985 | Fuderer | ......................... | 502/415 |
| 4,711,645 A | 12/1987 | Kumar | | |
| 5,232,474 A | 8/1993 | Jain | | |
| 5,769,928 A | 6/1998 | Leavitt | | |
| 5,779,767 A | 7/1998 | Golden et al. | | |
| 6,027,548 A | 2/2000 | Ackley et al. | | |
| 6,106,593 A * | 8/2000 | Golden et al. | ................... | 95/120 |
| 6,129,780 A * | 10/2000 | Millet et al. | ..................... | 95/117 |
| 6,284,021 B1 | 9/2001 | Lu et al. | | |
| 6,358,302 B1 | 3/2002 | Deng et al. | | |
| 6,379,430 B1 | 4/2002 | Monereau | | |
| 6,416,569 B1 * | 7/2002 | Bulow et al. | ..................... | 95/129 |
| 6,632,766 B2 * | 10/2003 | Kanazirev | ....................... | 502/64 |
| 6,638,340 B1 | 10/2003 | Kanazirev et al. | | |
| 7,094,275 B2 * | 8/2006 | Keefer et al. | .................... | 96/125 |
| 8,147,588 B2 | 4/2012 | Dolan et al. | | |
| 2004/0045434 A1 | 3/2004 | Golden et al. | | |
| 2008/0148937 A1 | 6/2008 | Rege et al. | | |
| 2010/0043635 A1 | 2/2010 | Gueret et al. | | |
| 2012/0048111 A1 | 3/2012 | Nakao et al. | | |

FOREIGN PATENT DOCUMENTS

EP 0 904 825 A2 3/1999

OTHER PUBLICATIONS

Yang, R.T., et al., Improved Pressure Swing Adsorption Processes for Gas Separation: By Heat Exchange between Adsorbers and by High-Heat-Capacity Inert Additives, *Ind. Eng. Chem. Process Des. Dev.* 1986, 25, 54-59.
Oliveira, Luiz C.A. et al., "Magnetic zeolites: a new adsorbent for removal of metallic contaminants from water", Water Research 38 (2004) 3699-3704.

\* cited by examiner

*Primary Examiner* — Frank Lawrence, Jr.
(74) *Attorney, Agent, or Firm* — Salvatore P. Pace

(57) ABSTRACT

The present invention relates generally to a composite adsorbent comprising at least a zeolite-containing $CO_2$ removal adsorbent and 10% or more of a metal oxide having a heat capacity of at least 20 cal/mol-° K (83.7 J/(mol·K). The composite is preferably used in a multi-layered adsorption system in a cyclic adsorption process. The adsorption system comprises two or more layers wherein the first layer is at least a water vapor removal adsorbent, such as activated alumina, and the second layer is the novel composite adsorbent. The adsorption system is preferably used in a PSA prepurification process prior to cryogenic air separation.

25 Claims, 2 Drawing Sheets

Table 1 Zeolite-Alumina- Iron Oxide Composites

| Example | Composition wt% | | | Porosity (%) | Packing Density (kg/m$^3$) | Crush Strength (N) | BSF (m$^3$/(s·m$^2$)) |
|---|---|---|---|---|---|---|---|
| | Zeolite 13X | Al$_2$O$_3$ | Fe$_3$O$_4$ | | | | |
| Com. A1 | 40 | 60 | 0 | 44 | 590 | 20.9 | 0.462 |
| Com. A2 | 40 | 59.5 | 0.5 | -- | 620 | 22.7 | 0.463 |
| Com. A3 | 40 | 58 | 2 | -- | 610 | 15.6 | 0.499 |
| 1 | 40 | 50 | 10 | 49 | 580 | 10.7 | 0.536 |
| 2 | 40 | 20 | 40 | 46 | 680 | 4.5 | 0.648 |
| 3 | 40 | 20 | 40 (Ore) | -- | 760 | 3.6 | 0.648 |
| 4 | 40 | 20 | 40 (Ore) | -- | 810 | 6.7 | 0.676 |
| 5 | 30 | 30 | 40 (Ore) | -- | 800 | 15.7 | 0.648 |
| 6 | 30 (NaX2.0) | 30 | 40 (Ore) | 40 | 840 | 16.0 | 0.786 |

FIG.2

PROCESS FOR SEPARATING GASES AND ADSORBENT COMPOSITIONS USED THEREIN

FIELD OF THE INVENTION

The present invention provides composite adsorbents useful in adsorption processes for separating components of a gas stream. More particularly, the present invention is directed to composite adsorbents useful for the removal of contaminants, such as at least carbon dioxide ($CO_2$), but also nitrogen oxides, hydrocarbons and other trace impurities, from feed gas streams in a cyclic adsorption process prior to further processing, especially prior to cryogenic air separation processes. Preferably, the composite adsorbent is used in an adsorption system with a first adsorbent layer to remove water or water vapor.

BACKGROUND OF THE INVENTION

Conventional air separation units (ASUs) for the production of nitrogen, oxygen, and argon using cryogenic distillation technology are well known. ASUs typically separate air into its primary component gases at very low or cryogenic temperatures using one or more distillation columns. It is essential that certain impurities such as water vapor, carbon dioxide, nitrogen oxides, and trace hydrocarbons be removed from the compressed air feed prior to cryogenic distillation to avoid freezing of the impurities in the cryogenic equipment and potentially causing explosion. Any freezing will require stopping the process to remove the detrimental solid mass of frozen gases which is costly and can damage equipment. Generally, the content of water vapor and carbon dioxide in the compressed air feed stream must be less than about 0.1 ppm and about 1.0 ppm, respectively in order to prevent freeze up of these gases in an ASU.

The air feed stream is therefore cleaned or purified to remove these impurities prior to distillation typically by an adsorption process employing two or more vessels filled with beds of one or more adsorbents which selectively adsorb the impurities. Once an adsorption bed is saturated with impurities, it needs to be regenerated by removing the impurities so the bed is ready for further use.

Current commercial methods for this pre-purification of air generally include either one of or a combination of a cyclic pressure swing adsorption or temperature swing adsorption process. Pressure swing adsorption (PSA) uses a change in pressure, including vacuum, to regenerate the adsorbent and temperature swing adsorption (TSA) uses a thermal driving force such as a heated purge gas to desorb the impurities. The TSA process usually requires much lower amount of purge flow compared to PSA and affords a longer cycle time, typically in the range of 4 to 10 hours. The PSA process requires a greater amount of purge flow and affords a much shorter cycle time in the order of minutes. Moreover, there is no requirement for regeneration heat energy in PSA as opposed to TSA. Hence, when there is sufficient waste nitrogen available in a cryogenic air separation plant, the PSA process is usually a preferred option for air prepurification due to its simplicity, lower capital cost, and lower operating cost.

One disadvantage of the PSA process is that the adsorbents do not always get completely regenerated at the completion of the purge step and hence their dynamic capacity, the ability to remove the desired components, is lowered compared to the adsorbents regenerated in TSA processes. As a result, the PSA process is typically run for short cycle times necessitating that the bed undergoes blowdown (vent) and repressurization at fairly frequent intervals. During the blowdown step, there is a noticeable loss of air trapped within the void spaces of the vessel and piping as well as the air adsorbed on or within the adsorbents. This air loss, referred to by various terms such as blowdown loss, vent loss, or bed switch loss, represents a significant waste as the air is not utilized towards air separation downstream of the prepurifier. More significantly, there is an operational cost disadvantage as the air lost during bed switches utilizes valuable compression power. Accordingly, there is an increasing need to reduce this power requirement and increase the operational efficiency of the PSA prepurification process.

One way to lower the power requirement of the PSA process is to reduce the blowdown or bed switch loss described previously. This can be accomplished by reducing the frequency of bed blowdown and repressurization, for example by extending the cycle time for which the bed is kept online prior to being switched to regeneration. However, since the conventional commercial adsorbents, including zeolite-alumina composites, afford only modest dynamic working capacities for removal of the common air contaminants described above, an increase in cycle time would require either reducing the feed flow significantly at a fixed bed size or require a drastic increase in the bed size at a fixed feed flow rate. However, it has been found that by modifying the adsorbents employed to provide increased working capacities the improvements required can be achieved.

The use of zeolites, aluminas and certain composite adsorbents comprising zeolites and aluminas in PSA prepurifiers is known. Examples of prior art alumina-zeolite composites are disclosed in U.S. Pat. Nos. 5,779,767, 6,027,548, 6,358,302, and 6,638,340. Examples of alumina-zeolite bead mixtures are disclosed in U.S. Pat. No. 6,027,548, and EP 0904825 A2. However, none of these teachings use a composite adsorbent containing 10% or more of a metal oxide having a heat capacity of at least 20 cal/mol-° K (83.7 J/(mol·K)) in the adsorption process.

BRIEF SUMMARY OF THE INVENTION

The present invention provides a superior composite adsorbent for removing gaseous impurities from feed gas streams in adsorption processes. The composite adsorbent can be used in $CO_2$ removal adsorption processes or can be used as part of a multi-layered adsorption system in a cyclic adsorption process for the prepurification of air.

In one embodiment, a multi-layered adsorption system for use in separating gases in a cyclic adsorption process is provided comprising two or more adsorbent layers wherein the first layer is at least a water vapor removal adsorbent and the second layer is the composite comprising at least a zeolite-containing $CO_2$ removal adsorbent and 10% or more of a metal oxide having a heat capacity of at least 20 cal/mol-° K (83.7 J/(mol·K)).

In another embodiment, a composite adsorbent is provided for use in removing at least $CO_2$ from a process gas stream in an adsorption process comprising a zeolite-containing $CO_2$ removal adsorbent and 10% or more of a metal oxide having a heat capacity of at least 20 cal/mol-° K (83.7 J/(mol·K)).

In yet another embodiment, a cyclic gas adsorption process for removing at least $CO_2$ from a gas stream having less than 5% $CO_2$ is provided, the process comprising contacting the gas stream with a multilayer adsorption system comprising two or more layers wherein the first layer is at least a water vapor removal adsorbent and the second layer is a composite comprising at least a zeolite-containing $CO_2$ removal adsorbent and 10% or more of a metal oxide having a heat capacity of at least 20 cal/mol-° K (83.7 J/(mol·K)) and recovering the $CO_2$ depleted gas stream.

Processes for using the adsorption system and composite adsorbent are also provided herein.

BRIEF DESCRIPTION OF THE DRAWINGS

FIG. 2 is a table showing the various compositions of composite adsorbents used in a simulated PSA process.

DETAILED DESCRIPTION OF THE INVENTION

Figure 1:
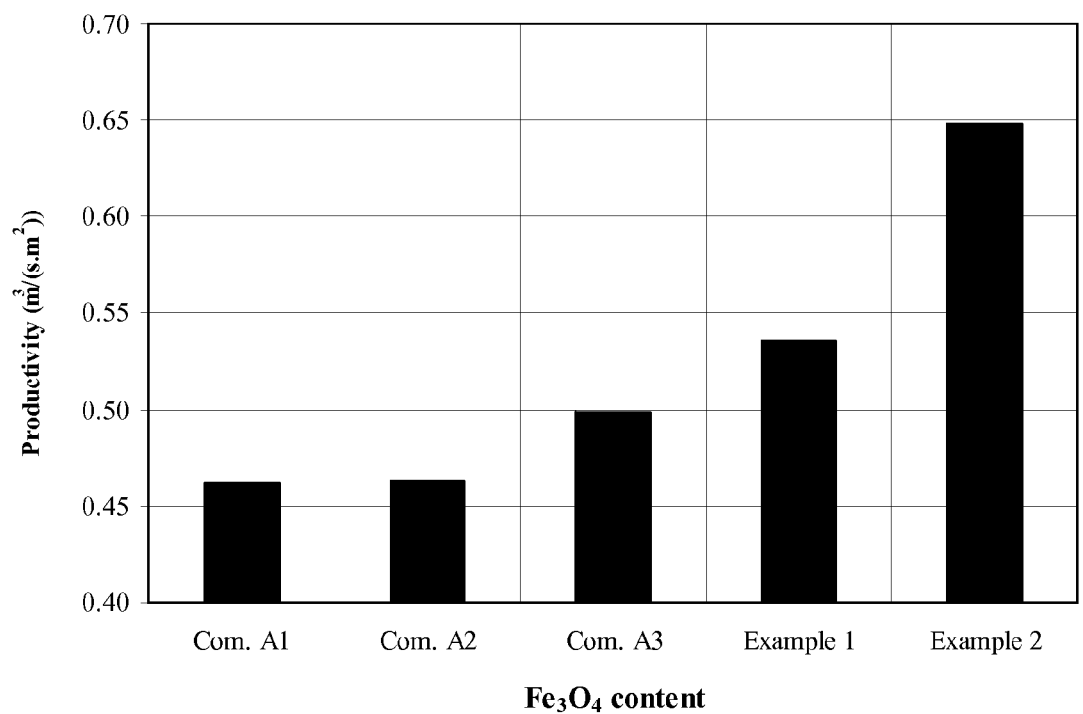
FIG. 1 is a graph showing composite adsorbents used in a simulated PSA process as a function of the amount of iron oxide in the composite adsorbent.

The present invention is directed to a superior composite adsorbent which is preferably used in a multi-layered adsorption system in a cyclic adsorption process for removing or separating gas components. As described herein, but not intending to be limited to, the adsorption process is used to remove undesirable gas components (impurities) in air prior to sending the purified air to a cryogenic air separation process designed to separate at least its primary components; namely oxygen, nitrogen, and argon. The adsorption process removes the impurities from an air feed gas stream by contacting the feed gas stream with the adsorption system in a conventional adsorption apparatus. While the adsorption process can be a PSA, TSA or VPSA (Vacuum Pressure Swing Adsorption) unit or combination thereof as is well known; or any cyclic adsorption system for separating at least $CO_2$; the inventive adsorbents are preferably used with PSA or VPSA systems used in prepurification of feed air to an ASU. Such units are known as air prepurification units (PPUs).

PSA or VPSA units or systems separate gas species from a mixture of gases under elevated pressure according to the gas species' molecular characteristics and affinity for the adsorbent. The feed air is passed through a first porous bed packed with the adsorbent material which adsorbs the target gas species at higher pressures and then the process reverses to a lower pressure and process gas is used to purge and desorb the gas species in the adsorbent material in the first bed. Typically, this process alternates between two or more beds maintaining a continuous operation. Most preferred are PSA units or systems which include 2 or more beds and which are conducted at or near ambient temperature to remove the impurities in air. Any reactor or vessel configuration can be employed such as a radial or axial configuration.

In general, the steps in the multi-bed PSA cycle include: (1) adsorption (feed) at high pressure, (2) countercurrent blowdown to lower pressure, (3) countercurrent purge with a gas relatively free of impurities, and (4) repressurization to high pressure with either feed air or purified air. The regeneration of the adsorbents in a PSA process is achieved by a combination of a simple reduction in pressure and purge with an impurity-free gas, such as waste $N_2$ available from the cryogenic air separation unit. The ratio of the flow rate of purge gas to that of the feed air is known as the purge-to-feed ratio (P/F). Since this regeneration method is less efficient than the use of thermal energy, as for example in a TSA process, the P/F ratio is typically higher in PSA processes. Also, a considerable residual loading of the impurity adsorbates remain on the adsorbents even at the end of the regeneration step. The difference between the adsorbent loading at the end of the feed step and that at the end of purge step is known as the working capacity. The working capacity is a function of the various operating conditions such as impurity concentrations in the feed and purge, pressure, temperature, and P/F and is also dependent on the selectivity and capacity of the adsorbent.

The present adsorbent compositions offer significantly improved working capacity compared to conventional alumina-zeolite only composites or mixtures. Performance improvements have been obtained by incorporating a metal oxide having a heat capacity of at least 20 cal/mol-° K (83.7 J/(mol·K)) into the composite. Without wishing to be bound by theory, it is believed that the addition of the metal oxide to the composite improves the thermal management properties of the composite, potentially suppressing undesirable thermal gradients that occur in the bed during process cycling thereby leading to an improvement in the working capacity of the adsorbent bed.

The composite adsorbent of this invention can be used for various adsorption processes, but is typically used as one of the layers in an adsorption system employing at least two layers of different adsorbents. The term "system" as used herein implies that there are multiple adsorbent layers either in direct contact or separated by a suitable separation means within the adsorbent bed. Each adsorbent layer can be comprised of a uniform or single material, composites of different materials, or any mixtures or combinations thereof, provided that, at least one layer is the composite adsorbent of this invention. The adsorbent layers are configured to remove certain gas impurities from the process gas in predetermined sequence during the process flow. For example, water vapor is often removed by the first layer prior to removing other gases with subsequent layers.

The composite adsorbent of this invention will be described herein as used in a preferred embodiment as a two layer adsorption system for use in a pre-purification unit (PPU) prior to cryogenic distillation. This description is not intended to limit the invention to air separation systems or to two layered adsorption systems.

The first layer of the adsorption system is in closest proximity to the air feed stream inlet and its primary purpose is to substantially remove the water or water vapor in the feed, although some $CO_2$ may also be removed by co-adsorption in the region of lower water loading. The first layer can be any suitable hygroscopic or desiccant material such as activated alumina, silica gel, various molecular sieves with activated alumina most common and preferred. The second layer is the composite adsorbent of this invention which contains a zeolite adsorbent capable of $CO_2$ selective adsorption in addition to at least one metal oxide component having a heat capacity of at least 20 cal/mol-° K (83.7 J/(mol·K)). The zeolite-containing composite removes the remainder of the $CO_2$, any trace hydrocarbons present in the feed, particularly acetylene, and any nitrogen oxides such as $N_2O$.

As defined herein, the term "composite" is used to indicate that the individual adsorbent materials are in intimate contact within a given agglomerated particle and preferably in a substantially uniform distribution. Composite adsorbents are easily distinguished from adsorbent mixtures in that at least two components are present within a single agglomerated particle and combined together during the adsorbent manufacturing process rather than physically mixed or blended together thereafter. In composites adsorbents, each of the component materials within the particles is in direct contact with the process gas at some point within the particle. In the example of zeolite-alumina composite beads, as defined herein, it is to be understood that crystallites of zeolite are blended with fine typically micron or sub-micron sized particles of alumina or an alumina source during the manufacturing process, such that a given bead or other agglomerated particle of the final composite contains both alumina and zeolite particles in direct contact with one another.

In the present invention, the composite adsorbent has at least 2 components, and preferably 3 components, blended together, agglomerated, and calcined to prepare the final composite particles in the ratios described below. All percentages throughout this specification are in weight percents and expressed on a dry weight basis unless otherwise noted. Since all commercial size batches or lots of adsorbents will have some variance, the exact ratios will typically vary within about 2 percentage points and such small variations are considered within the scope of this invention.

The preferred composition of the composite adsorbent comprises adsorbent materials as follows:
- 10-50% of a zeolite, preferably having $SiO_2/Al_2O_3$ ratio of less than or equal to 2.5,
- 5-45% of a binding agent, preferably activated alumina,
- 10-50%, preferably 40%, of metal oxide having a heat capacity of at least 20 cal/mol-° K (83.7 J/(mol·K)), preferably 25 cal/mol-° K (104.6 J/(mol·K)), and most preferably 30 cal/mol-° K (125.5.5 J/(mol·K)), wherein the total of zeolite, activated alumina and metal oxide equals 100 weight percent as measured on a dry weight basis.

The choice of zeolite type for effective air purification is preferably from the Faujasite group and especially zeolites X and Y. By addition of a metal oxide having the heat capacities as described above, stronger zeolites, including zeolite X having $SiO_2/Al_2O_3$ ratios of about less than or equal to 2.5, can be effectively regenerated under PSA cycling. This occurs even with zeolites such as low silica X having $SiO_2/Al_2O_3$ ratios of about 2.0 which could not be effectively regenerated in the past. Other low silica zeolites including zeolite A are expected to offer acceptable performance, although less preferred due to their intrinsically lower $CO_2$ capacity compared to the larger pore Faujasite type zeolites, especially zeolite X.

As further explained below, it is preferred to use binding agents in the composite. Any commonly known binding agents used in adsorbent processing which provide sufficient crush strength and which do not interfere with the adsorption process can be employed. Preferred are aluminas such as transitional aluminas, active aluminas, and alumina reagents including hydroxides which upon calcination become alumina and help give the product composite adsorbents sufficient crush strength for use. The preferred compositional range for the alumina has been determined based on the required crush strength for use in cyclic adsorption processes, but is preferably more than about 4.5 Newtons (N) (1.0 lbf).

The selection of suitable metal oxides is made based on their heat capacity and therefore their ability to manage the thermal gradients which are known to exist within an adsorbent bed. Without wishing to be bound by theory, it is believed that the performance improvements to the adsorption process, and more specifically to the PSA prepurifier performance, is achieved by selection of metal oxides with heat capacity values of greater than 20 cal/mol-° K (83.7 J/(mol·K)) and at concentrations of greater than 10% by weight, preferably 40%. Adsorbents with such metal oxides have been found to effectively manage the adverse temperature gradients that are generated upon multiple adsorption and desorption cycles. As a result, it is desirable to use as much of the metal oxide as possible, with the caveat that sufficient crush strength must still be achieved in the final product and sufficient $CO_2$ working capacity retained to enable it to be used successfully in a cyclic adsorption system as described herein. For example, in representative 8×12 mesh (2.0 to $2.36 \times 10^{-3}$ m) composite particles, crush strengths of greater than about 4.5 newtons (N) are desirable. If the metal oxide and $CO_2$ adsorbing zeolite particles do not combine such that adequate crush strength is achieved, alumina or other suitable binding agent must be used to provide sufficient crush strength. Composites formed entirely of zeolite and iron oxide without the presence of a suitable binding agent such as alumina have not been found to possess the required crush strength to enable an adsorbent bed to be loaded and properly operated in certain cyclic adsorption processes. Thus, it is preferred to have at least 5% of alumina and not more than 50% metal oxide in the final composition of the composite.

Suitable metal oxides useful in the composite adsorbent of this invention include metal oxides having a heat capacity of greater than 20 cal/mol-° K (83.7 J/(mol·K)), preferably greater than 25 cal/mol-° K (104.6 J/(mol·K)), and most preferably of greater than 30 cal/mol-° K (125.5 J/(mol·K)). The Table below lists examples of metal oxides with their respective heat capacities.

TABLE

Metal Oxides Heat Capacity (J/(mol · K))*

| Oxides | Heat Capacity cal/mol-° K/(J/(mol · K)) |
|---|---|
| $Al_2O_3$ | 18.89 (79.04) |
| $SiO_2$ | 10.56 (44.18) |
| $Na_2O$ | 16.52 (69.12) |
| Wustite ($Fe_{0.95}O$) | 11.50 (48.12) |
| Hematite ($Fe_2O_3$) | 24.82 (103.85) |
| Magnetite ($Fe_3O_4$) | 34.28 (143.43) |
| $Pb_3O_4$ | 35.10 (146.86) |
| $Mn_3O_4$ | 33.38 (139.66) |
| $Ta_2O_3$ | 32.30 (135.14) |
| $V_2O_5$ | 30.51 (127.65) |
| $Co_3O_4$ | 29.50 (123.43) |
| $2BaO \cdot 3SiO_2$ | 53.68 (224.60) |
| Cordierite ($Mg_3Al_4Si_5O_{16}$) | 108.10 (452.29) |
| Analcite ($NaAlSi_2O_6$) | 39.30 (164.43) |

For commercial size adsorption units using large quantities of adsorbents, low cost metal oxides are needed in the composite adsorbent to reduce costs. Accordingly, preferred are metal oxides are selected from oxides of iron (Fe), cobalt (Co), or lead (Pb) or combinations thereof. More preferred are oxides of iron, including naturally occurring iron ores rich in iron oxides, because of their cost and availability. The iron oxides found in ores typically include magnetite ($Fe_3O_4$), hematite ($Fe_2O_3$), goethite (FeO(OH)), or limonite (FeO(OH)·n($H_2O$)) and all forms of these iron oxides are useful herein. Suitable naturally occurring iron ores can have vary concentrations of iron oxides but will have the required heat capacities per amount of iron ore used.

Most preferred are oxides of iron wherein Fe3O4 is the predominant oxide species present. In determining the heat capacity, it is understood that the relative heat capacity for the metal oxide material as a whole must be determined which may contain variations and mixtures of metal oxides and varying oxidation states. It is further understood that the metal oxide component of the composite, such as the oxides of iron, may come from different forms and origins, and may change valence and/or undergo some level of chemical transformation during the manufacturing process used to prepare the final composite adsorbent material. Any such changes are not believed to significantly modify the heat capacity of the metal oxide material if properly prepared as taught herein and such changes do not take the metal oxide materials outside the scope of this invention. The metal oxides can also include various impurities at levels that do not adversely impact the adsorption process.

The metal oxide components useful herein can also include complex metal oxide species which can be metal oxides that are coated, impregnated, or molecularly integrated into carrier or support materials, such as silicon and/or alumina oxides, to form complex metal-silica/alumina oxides having heat capacities of greater than 20 cal/mol-° K (83.7 J/(mol·K)). The metal oxides are present in amounts of at least 10%, preferably 40%, by weight in order to achieve the superior results seen in the present invention. Although this invention has been described with specific reference to metal oxides, one skilled in the art will recognize that other metal compounds including metal carbonates, metal hydroxides and mixtures thereof could be employed instead of or in combination with the referenced metal oxides, provided that the heat capacities of the materials are at least 20 cal/mol-K (83.7 J/(mol·K)).

Preferred forms for the composite adsorbents described herein include beads, pellets, and extrudates as are known in the art. In terms of preferred particle sizes, any size that gives acceptable pressure drop in a PSA PPU are acceptable, for example particles in the 7×14 US mesh (1.4 to $2.8 \times 10^{-3}$ m) size range are typical for many reactor or bed designs.

According to another embodiment of this invention, the composite adsorbent can itself be used in certain gas adsorption processes to remove $CO_2$ and other gases. In this embodiment, the adsorbent can be used in a gas purification process although it is practically limited to feed streams containing not more than 5% $CO_2$.

The examples below use the inventive adsorbents under cyclic test conditions representative of a typical PSA process. The examples below include comparative examples (labeled Comparative Examples) and examples within the scope of this invention (labeled as Examples). The comparative examples include adsorbent compositions outside the scope of this invention. The comparative examples are used to illustrate the unexpected results achieved with the inventive adsorbents.

Each of the Examples, as described in detail below, was prepared using the following equipments and procedures. Methylcellulose additive is used as a forming aid and is blended with the zeolite and activated alumina (binding agent) components during either the dry mixing or in the wet mix stage. Generally, 0.5-2% of such additive is sufficient. The agglomeration stage is carried out after a suitable amount of water is added during a prolonged wet mixing step. The agglomeration method is not limiting and can be extrusion or pelletization and/or typical bead-making as known to those skilled in the art, using any suitable rotating equipment such as a pan granulator, Nauta mixer or accretion wheel. For the Examples and Comparative Examples described below, the following generalized method of making was employed:

Step 1. Measure and mix the zeolite (NaX2.5 or NaX2.0) and active alumina powders, as well as the corresponding amount of iron oxide-containing powder (either pure iron oxide or ground natural iron ore commercially available) when used, adding 1.5% Methocel F4M (methylcellulose from Dow Chemical) as forming aid; Dry mix all the above in a mechanical mixer for approximately 1 hour.

Step 2. Grow the beads by adding suitable amounts of water while mixing at higher speed; wet mixing time approximately 30 minutes. The green beads formed by the above mixing process are then sealed and stored in a container at room temperature for approximately 48 hours, to age them and improve the green strength;

Step 3. Dry and calcine the aged green beads in air flow up to 380° C. for approximately 2 hours. The porosity of the beads was measured by the mercury porosimetry method using a Micromeritics Autopore 9520 measuring unit. The crush strength was determined using the single bead method, employing 40 beads and using a Dr. Schleuniger Pharmatron 8M Tablet Tester unit equipped with a 50 N load cell. Prior to crush strength measurements the samples were screened to 8×10 mesh (2.00 to $2.36 \times 10^{-3}$ m) size and activated at 380° C. in air.

In order to test the performance of the adsorbents under conditions which are representative of those experienced by the composite adsorbent in a PSA PPU, a cyclic test system was designed to measure the working capacity of the adsorbent for $CO_2$ (and/or $N_2O$) under PSA cycling. The system runs a 4-step cycle: (1) Pressurization or Equilibration; (2) Adsorption under higher pressure; (3) Depressurization to close to atmospheric pressure; and (4) Regeneration under lower pressure. The test parameters are set to simulate PSA prepurifer operation. One parameter is used to evaluate the adsorbent productivity, where productivity is a measure of the amount of air which can be purified with the adsorbent being tested under the PSA conditions; namely the feed gas flow rate for a fixed cycle time. The higher the gas feed flow rate successfully purified through a specific sorbent bed, the higher the productivity.

The pressure swing adsorption test system consists of a vertical cylindrical stainless steel vessel of fixed dimensions packed with adsorbent. In order to have better simulation with plant operation conditions, the cyclic PSA tests are configured to run close to adiabatic conditions, by adding insulation around the adsorbent bed (which is otherwise exposed to ambient conditions) to prevent excessive heat leak to ambient to account for the thermal effects observed in large (plant scale) adsorbent vessels.

The PSA cycle included: 1) pressurization to 145 psia (999.74 kPa), 30 sec.; 2) adsorption at 145 psia (999.74 kPa), 180 sec.; 3) depressurization to 15 psia (103.42 kPa), <10 sec.; and 4) purge regeneration at 15 psia (103.42 kPa), 150 sec. The gas flow rate during the adsorption is manually adjusted to ensure maximum flow such that the bed sustains maximum 1 ppm $CO_2$ at the outlet during the adsorption step, while the purge flow is adjusted accordingly with a purge-to-feed ratio of 60%.

The pressurization step was carried out by charging $CO_2$-free nitrogen into the adsorption vessel. During the adsorption step, the pressurized nitrogen was blended with a contaminant such as carbon dioxide to obtain approximately 400 ppm composition, and preheated to 40° C., then passed upwards through the adsorption vessel which was un-heated, but insulated as in an adiabatic environment. Purge regeneration was carried out by passing $CO_2$-free nitrogen downwards through the vessel at 25° C. During the process the $CO_2$ at the exit of the adsorption vessel was measured using a commercially available multi-gas analyzer.

The above-described PSA cycle was repeated continuously until stabilization was achieved. In practice at least 250 PSA cycles were run on each sample. Stabilization is achieved when the $CO_2$ concentration of the bed remains constant and the outlet $CO_2$ concentration is below 1 ppm at the end of successive feed steps. The adsorbent performance (productivity) is described as bed size factor (BSF), calculated as the maximum amount of feed gas flow rate ($N_2$ contaminated with 400 ppm $CO_2$) per cross sectional area of the adsorbent vessel to produce clean product with not more than 1 ppm $CO_2$. The BSF value is expressed in a unit of normal cubic meter per second ($m^3/s$) per cross sectional area of test bed (m²). All the tests are carried out on samples pre-screened to 8×10 mesh (2.00 to 2.36×10⁻³ m) size, followed by careful re-activation at 380° C. immediately before PSA testing.

The weights below for the zeolites, alumina, and metal oxides are expressed on a dry weight basis and the weight for the methylcellulose is on an as purchased basis.

Preparation of Comparative Example A1

40% NaX2.5+60% $Al_2O_3$ with No Iron Oxide 0.312 kg of zeolite NaX2.5 powder were mixed with 0.468 kg activated $Al_2O_3$ in a Hobart planetary mixer equipped with a flat beater mixing paddle for 45 minutes, together with 0.012 kg Methocel F4M. 0.469 kg deionized water was then added into the mixer while the material mixed for additional 20 minutes. The resulting green beads were then sealed and stored in a container at room temperature for approximately 48 hours, to age them and improve the green strength. The aged beads were pre-screened into size of 8×12 mesh (2.00 to 2.36×10⁻³ m), dried and calcined in a dry air flow at 380° C. for approximately 2 hours.

Preparation of Comparative Example A2

40% NaX2.5+59.5% $Al_2O_3$+0.5% $Fe_3O_4$ 0.312 kg of zeolite NaX2.5 powder were mixed with 0.464 kg activated $Al_2O_3$ and 0.012 kg Methocel F4M and 0.0039 kg $Fe_3O_4$ from Sigma Aldrich, in a Hobart planetary mixer equipped with a flat beater mixing paddle for 45 minutes. 0.446 kg deionized water was then added into the mixer while the material mixed for additional 20 minutes. The resulting green beads were then sealed and stored in a container at room temperature for approximately 48 hours, to age them and improve the green strength. The aged beads were pre-screened into size of 8×12 mesh (2.00 to 2.36×10⁻³ m), dried and calcined in air flow at 380° C. for approximately 2 hours.

Preparation of Comparative Example A3

40% NaX2.5+58% $Al_2O_3$+2% $Fe_3O_4$ 0.312 kg of zeolite NaX2.5 powder were mixed with 0.452 kg activated $Al_2O_3$ and 0.012 kg Methocel F4M and 0.0156 kg $Fe_3O_4$, in a Hobart planetary mixer equipped with a flat beater mixing paddle for 45 minutes. 0.465 kg deionized water was then added into the mixer while the material mixed for additional 15 minutes. The resulting green beads were then sealed and stored in a container at room temperature for approximately 48 hours, to age them and improve the green strength. The aged beads were pre-screened into size of 8×12 mesh (2.00 to 2.36×10⁻³ m), dried and calcined in air flow at 380° C. for approximately 2 hours.

Preparation of Example 1

40% NaX2.5+50% $Al_2O_3$+10% $Fe_3O_4$ 0.312 kg of zeolite NaX2.5 powder were mixed with 0.390 kg activated $Al_2O_3$, as well as 0.012 kg Methocel F4M and 0.078 kg $Fe_3O_4$, in a Hobart planetary mixer equipped with a flat beater mixing paddle for 45 minutes. 0.539 kg deionized water was then added into the mixer while the material mixed for additional 15 minutes. The resulting green beads were then sealed and stored in a container at room temperature for approximately 48 hours, to age them and improve the green strength. The aged beads were pre-screened into size of 8×12 mesh (2.00 to 2.36×10⁻³ m), dried and calcined in air flow at 380° C. for approximately 2 hours.

Preparation of Example 2

40% NaX2.5+20% $Al_2O_3$+40% $Fe_3O_4$ 0.312 kg of zeolite NaX2.5 powder were mixed with 0.156 kg activated $Al_2O_3$, 0.012 kg Methocel F4M, and 0.312 kg $Fe_3O_4$ in a Hobart planetary mixer equipped with flat beater mixing paddle for 45 minutes. 0.330 kg deionized water was then added into the mixer while the material mixed for additional 8 minutes. The resulting green beads were then sealed and stored in a container at room temperature for approximately 48 hours, to age them and improve the green strength. The aged beads were pre-screened into size of 8×12 mesh (2.00 to 2.36×10⁻³ m), dried and calcined in air flow at 380° C. for approximately 2 hours.

PSA Cyclic $CO_2$ Testing

Comparative Examples A1-A3 were made following the procedure described above and as a result, the porosity and density properties fell within a narrow range as shown in FIGS. 1 and 2. The cyclic PSA tests were run on samples having 8×10 mesh (2.00 to 2.36×10⁻³ m) particle sizes, following equivalent thermal pre-treatment. The pre-screening therefore renders a fair comparison for various samples by removing any significant particle size effects.

FIGS. 1 and 2 show the cyclic PSA performance as a function of amount of iron oxide in the composite. The measured PSA productivity, in terms of bed size factor (BSF), for Comparative Examples and Examples 1 and 2 is shown in FIG. 2. The performance of the Comparative Examples A1-A3, are in the range observed for commercial reference materials.

It is clear that the PSA performance (expressed in terms of productivity, defined above) has been greatly improved with the addition of 10% or more iron oxide species to the zeolite-alumina composites. More specifically, there is a linear trend of higher productivity with increasing percentage of iron oxide (at fixed amount of zeolite). Example 2 (see FIG. 2) shows that with 20% alumina in the composite, the porosity characteristics are good and the product beads have adequate crush strength.

Specific Examples 3-5 (Iron Ore Addition): Examples 3-5 were made with the same composition as Example 2, except the pure iron oxide powder from Sigma Aldrich was replaced with a raw iron ore provided by Kiruna Iron Ore Mine of LKAB in Sweden, which was ground into fine powders in our lab before forming the composite.

Preparation of Example 3

40% NaX2.5+20% $Al_2O_3$+40% Iron Ore 0.312 kg of zeolite NaX2.5 powder were mixed with 0.156 kg activated $Al_2O_3$, 0.012 kg Methocel F4M, and 0.312 kg ground iron ore in a Hobart planetary mixer equipped with flat beater mixing paddle for 50 minutes. 0.302 kg deionized water was then added into the mixer while the material mixed for additional 10 minutes. The resulting green beads were then sealed and stored in a container at room temperature for approximately 48 hours, to age them and improve the green strength. The aged beads were pre-screened into size of 8×12 mesh (2.00 to 2.36×10⁻³ m), dried and calcined in air flow at 380° C. for approximately 2 hours.

Preparation of Example 4

40% NaX2.5+20% Al₂O₃+40% Iron Ore 1.560 kg of zeolite NaX2.5 powder were mixed with 0.780 kg activated Al₂O₃, as well as 0.060 kg Methocel F4M and 1.560 kg ground iron ore, in a Hobart planetary mixer equipped with flat beater mixing paddle for 45 minutes during dry mixing. 0.600 kg deionized water was then added into the Hobart mixer while the material mixed for additional 30 minutes. The mixture was then transferred to a Nauta mixer, 0.868 kg additional deionized water was then added into the Nauta mixer while the material mixed for additional 180 minutes until beads formed. The resulting green beads were then sealed and stored in a container at room temperature for approximately 48 hours, to age them and improve the green strength. The aged beads were pre-screened into size of 8×12 mesh (2.00 to 2.36×10⁻³ m), dried and calcined in air flow at 380° C. for approximately 2 hours.

Preparation of Example 5

30% NaX2.5+30% Al₂O₃+40% Iron Ore 0.234 kg of zeolite NaX2.5 powder were mixed with 0.234 kg activated Al₂O₃, as well as 0.012 kg Methocel F4M and 0.312 kg ground iron ore, in a Hobart planetary mixer equipped with a flat beater mixing paddle for 90 minutes. 0.305 kg deionized water was then added into the mixer while the material mixed for additional 20 minutes. The resulting green beads were then sealed and stored in a container at room temperature for approximately 48 hours, to age them and improve the green strength. The aged beads were pre-screened into size of 8×12 mesh (2.00 to 2.36×10⁻³ m), dried and calcined in air flow at 380° C. for approximately 2 hours.

Table 1 also lists the cyclic test results of the iron-ore containing composites, under same conditions as tested above. It can be seen that Example 3 (40% iron ore) exhibits same performance as Example 2 (40% pure iron oxide) with same zeolite-alumina composition, indicating that such new composites can be made using cheap and natural resources, which would eliminate the concerns of higher adsorbent cost and/or large scale production.

Example 4 made using Nauta mixer with same recipe as Example 3, showed similar performance as both Examples 2 and 3, showing that the composite can be scaled up without losing its superiority.

It is worth noting that, a similar composite Example 5 with slightly less NaX2.5 zeolite (30% vs. 40% for Example 3), balanced with slightly more alumina (30%) also exhibited similar cyclic performance, yet the physical strength and appearance were significantly improved. This again indicates that the preferred composite should contain a suitable amount of a binder to ensure adequate crush strength and, in the case of alumina, to potentially supplement the adsorption properties of the zeolite, especially for water removal.

Preparation of Example 6

30% NaX2.0+30% Al₂O₃+40% Iron Ore

Example 6 had the same composition as described above for Example 5 except that the zeolite NaX2.5 powder was replaced with a low silica to alumina zeolite X (NaX2.0). 1.170 kg of zeolite NaX2.0 powder were mixed with 1.170 kg activated Al₂O₃, 0.060 kg Methocel F4M, and 1.560 kg ground iron ore in a Hobart planetary mixer equipped with a flat beater mixing paddle for 90 minutes during dry mixing. 0.690 kg deionized water was then added into the Hobart mixer while the material mixed for additional 30 minutes. The mixture was then transferred to a Nauta mixer, and 0.799 kg additional deionized water was added into the Nauta mixer while the material mixed for additional 150 minutes until beads formed. The resulting green beads were then sealed and stored in a container at room temperature for approximately 48 hours, to age them and improve the green strength. The aged beads were pre-screened into size of 8×12 mesh (2.00 to 2.36×10⁻³ m), dried and calcined in air flow at 380° C. for approximately 2 hours.

Since the addition of iron oxide greatly improves the regenerability of the zeolite-alumina composites under PSA operating conditions, we are therefore able to utilize zeolites with higher intrinsic $CO_2$ adsorption capacity, thus the zeolite component in Example 6 was switched from NaX2.5 to NaX2.0, with the same other components.

The invention described herein also solves the problem of PSA prepurifier cycle time extension by providing an adsorption system with the novel composite adsorbent that enables the prepurifier to operate under extended PSA cycle times improving the operational process and at the same time reducing the overall cost of the process and its equipment.

It should be apparent to those skilled in the art that the subject invention is not limited by the examples provided herein which have been provided to merely demonstrate the operability of the present invention. The selection of appropriate adsorbent components, feed gases and process conditions can be determined from the specification without departing from the spirit of the invention as herein disclosed and described. The scope of this invention includes equivalent embodiments, modifications, and variations that fall within the scope of the attached claims.

What is claimed is:

1. A multi-layered adsorption system for use in separating gases in a PSA or VPSA cyclic adsorption process comprising two or more adsorbent layers wherein the first layer is at least a water vapor removal adsorbent and the second layer is a composite adsorbent comprising agglomerated particles of 10-50% of a zeolite; 5-45% of activated alumina; and 10-50% of a metal oxide having a heat capacity of at least 20 cal/mol-° K (83.7 J/(mol·K)) in substantially uniform distribution and wherein the total of the zeolite, activated alumina and metal oxide equals 100 weight % as measured on a dry weight basis and the crush strength is more than about 4.5 Newtons (N) for particles in the 7×14 US mesh size range.

2. The adsorption system of claim 1 wherein the metal oxide selected from oxides of iron, cobalt, and lead.

3. The adsorption system of claim 2 wherein the metal oxide is one or more oxides of iron.

4. The adsorption system of claim 3 wherein the metal oxide is a naturally occurring iron ore rich in iron oxides.

5. The adsorption system of claim 3 wherein Fe3O4 is the predominant oxide species present.

6. The adsorption system of claim 3 wherein the zeolite is type X and has a SiO2/Al2O3 ratio of about less than or equal to 2.5.

7. The adsorption system of claim 1 wherein the composite has 40% of an X zeolite, 20% of activated alumina and 40% of a metal oxide selected from oxides of iron.

8. A cyclic adsorption process for removing at least water and CO2 from a gaseous water and CO2 containing feed stream comprising contacting the feed stream with the adsorption system of claim 1.

9. A composite adsorbent for use in removing at least CO2 from a process gas stream in a PSA or VPSA adsorption process comprising a zeolite-containing CO2 removal adsorbent comprising agglomerated particles of 10-50% of a zeolite; 5-45% of activated alumina; and 10-50% of a metal oxide having a heat capacity of at least 20 cal/mol-° K (83.7 J/(mol·K)) in substantially uniform distribution and wherein the total of the zeolite, activated alumina and metal oxide equals 100 weight % as measured on a dry weight basis and the crush strength is more than about 4.5 Newtons (N) for particles in the 7×14 US mesh size range.

10. The adsorbent of claim 9 wherein the composite contains a metal oxide selected from oxides of iron, cobalt, and lead.

11. The adsorbent of claim 10 wherein the metal oxide is a naturally occurring iron ore rich in iron oxides.

12. The adsorbent of claim 10 wherein the composite is one or more oxides of iron and Fe3O4 is the predominant oxide species present.

13. The adsorbent of claim 9 wherein the composite contains 40% of a zeolite, 20% of activated alumina and 40% of a metal oxide.

14. The adsorbent of claim 9 wherein the zeolite is type X and has a SiO2/Al2O3 ratio of about 2.0.

15. A cyclic adsorption process for removing CO2 from a gaseous feed stream containing at least water and not more than 5% CO2 comprising contacting the feed stream with the adsorption system of claim 9 and recovering the CO2 depleted stream.

16. A cyclic PSA or VPSA process for removing at least CO2 from a gas stream having less than 5% CO2, the process comprising contacting the gas stream with a multilayer adsorption system comprising two or more layers wherein the first layer is at least a water vapor removal adsorbent and the second layer is a composite comprising at least a zeolite-containing CO2 removal adsorbent and 10-50% of a zeolite; 5-45% of activated alumina; and 10-50% of metal oxide having a heat capacity of at least 20 cal/mol-° K (83.7 J/(mol·K)) and wherein the total of zeolite, activated alumina and metal oxide equals 100 weight % as measured on a dry weight basis and recovering the CO2 depleted gas stream.

17. The process of claim 16 wherein the adsorbent also removes nitrogen oxides, hydrocarbons or both.

18. The process of claim 16 wherein the metal oxide is selected from oxides of iron, cobalt, and lead.

19. The process of claim 18 wherein the metal oxide is one or more oxides of iron.

20. The system of claim 19 wherein the metal oxide is a naturally occurring iron ore rich in iron oxides.

21. The process of claim 19 wherein the Fe3O4 is the predominant oxide species present.

22. The process of claim 18 wherein the zeolite is type X and has a SiO2/Al2O3 ratio of about less than or equal to 2.5.

23. The process of claim 18 wherein the zeolite is type X and has a SiO2/Al2O3 ratio of about 2.0.

24. The process of claim 16 wherein the process is conducted at or near ambient temperature.

25. The process of claim 24 wherein the process is a PSA prepurification process for the removal of at least water and CO2 in air prior to a cryogenic air separation process.

* * * * *